(No Model.)
A. BUCHHOLZ & A. W. EDDY.
HAY PRESS FOR FUEL PURPOSES.
No. 290,741. Patented Dec. 25, 1883.
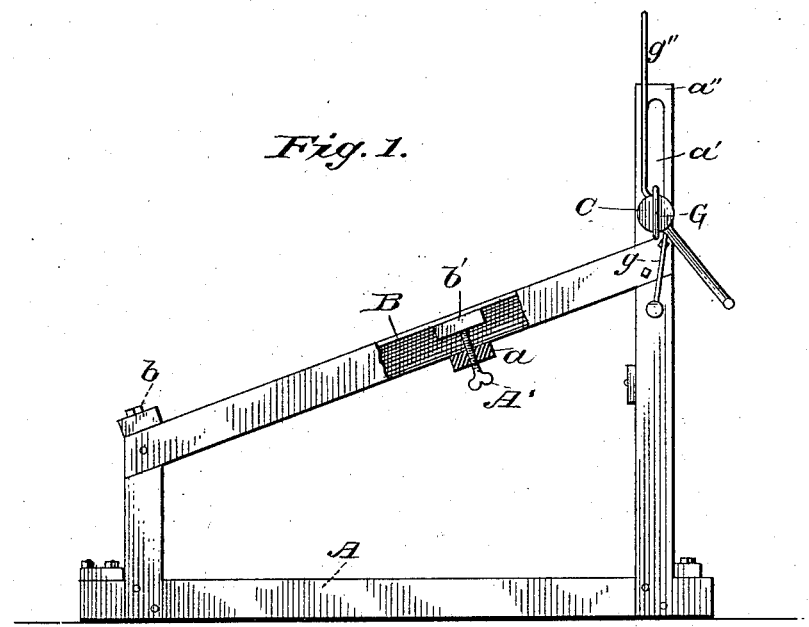
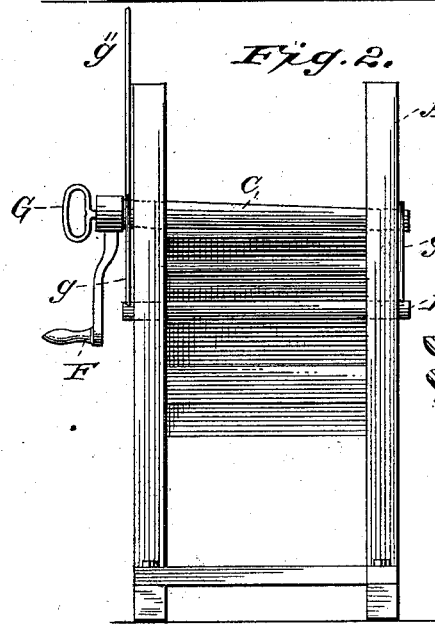
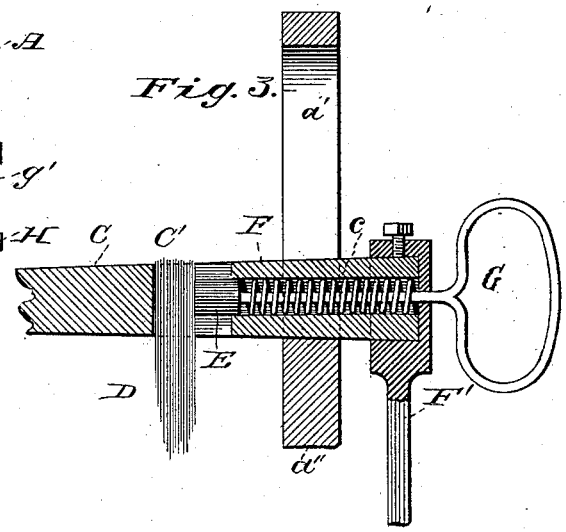

UNITED STATES PATENT OFFICE.

AUGUST BUCHHOLZ, OF APPLETON, AND ALMON W. EDDY, OF ZUMBROTA, MINNESOTA.

HAY-PRESS FOR FUEL PURPOSES.

SPECIFICATION forming part of Letters Patent No. 290,741, dated December 25, 1883.

Application filed May 26, 1883. (No model.)

*To all whom it may concern:*

Be it known that we, AUGUST BUCHHOLZ, a citizen of the United States, residing at Appleton, in the county of Swift and State of Minnesota, and ALMON W. EDDY, a citizen of the United States, residing at Zumbrota, in the county of Goodhue and State of Minnesota, have invented certain new and useful Improvements in Hay-Presses for Fuel Purposes; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to that class of hay-presses which are constructed for the purpose of pressing hay or straw in a suitable form and manner to be used as fuel; and it consists in a roller upon which the hay or straw is rolled and firmly pressed thereon by spring-boards; and it further consists in a roller constructed tapering, to be easily withdrawn from the roll of pressed hay, and provided with a mortise and a yielding bar or rod to hold the hay in position to start the rolling and pressing by pressure of the same; and it further consists in a supplemental roller or bar provided with arms for retaining the roll in position and releasing the same.

The object of our invention it to provide a cheap, practicable, and durable device, by the use of which hay or straw may be readily prepared for fuel for domestic purposes. We accomplish this object by the mechanism illustrated in the accompanying drawings, of which—

Figure 1 is a side elevation, partly in section. Fig. 2 is an end elevation. Fig. 3 is an enlarged detail, in section, of the roll, mortise, and yielding holder.

The same letters are employed in all the figures in referring to identical parts.

The frame A is suitably constructed, preferably of wood, and provided with the yielding floor or planks B, which are held in position by the cross-bar $b$, while the other ends of the same pass under the roller C. The hand-screws A′ pass through the cross-bar $a$, and bear against the cross-bar $b'$. By means of this screw the pressure of the spring-planks upon the roller may be increased or diminished at the pleasure of the operator. The mortise C′ passes centrally through the larger end of the roller, and is sufficient in dimensions to admit the free introduction of a small wisp of hay or straw, D, when the follower E is borne to its rearward position. This follower E is introduced into the roller C at the opening $c$ in the larger end of the same, which opening communicates with the mortise C′. The spring F rests upon the crank F′, which covers the opening at the end of the roller and bears the follower against the wisp of hay, holding it in position. The handle G is to enable the operator to control the position of the follower E in the introduction of the wisp D or the pressure upon the same. The supplemental roller H is provided with the hooked arms $g$ and $g'$, which are firmly introduced into the same and formed with hook-like curves, to retain the roller C in position while in operation. One or both of these arms $g$ may extend upward, as shown at $g^2$, to enable the operator to release the bearings of the same and free the roller after a roll of hay or straw is ready to be removed from the press, and to facilitate this removal there is a slot or elongated mortise, $a'$, in the upright portion of the frame in which the roller has its bearings.

Operation: Hay or straw is placed upon the spring-planks B, the operator withdraws the follower E by means of the handle G, introduces a wisp of hay or straw into the mortise C′, when the spring F presses the follower E against the wisp and retains it in position, thus causing the hay or straw to be formed in a roll upon the roller as the crank F′ is turned. When the roll of hay or straw is ready to be removed from the press, the follower E is withdrawn from the wisp by means of the handle G. The arms $g$ and $g'$ are removed from their bearings upon the roller C by means of the extended arm or lever $g^2$, the arm $g$ in this case being removed by the action of the roller H, which is operated in its bearings by means of the arm and lever $g$ and $g^2$. The pressure from the roller is now removed and the roller carried well up in the slot $a'$ of the standard $a^2$. The operator now releases the pressure of the spring upon the wisp by withdrawing the handle G. The roll of pressed hay and the roller C are now held in position by the uprights $a^2$ of the frame, and the roller is withdrawn from the roll of pressed hay by means of the handle G and the crank F, when the parts are returned to the original position, as shown in the drawings, ready for another operation.

We find it advisable to use a small narrow wedge-shaped tucker to force the last wisps of hay into the roll before the pressure is removed from the same, to prevent it from unrolling.

What we claim as new and useful in presses for pressing hay or straw for fuel, and for which we desire to obtain Letters Patent, is—

1. In a press for pressing hay or straw for fuel, the frame A, provided with the standard $a^2$, and the spring planks or boards B, as and for the purposes substantially as set forth.

2. In a press for pressing hay or straw for fuel, the frame A, provided with the spring-planks B and the thumb-screws A', as and for the purposes substantially as set forth.

3. In a press for pressing hay or straw for fuel, the roller C, provided with the mortise C', the follower E, the spring F, and the handle G, as and for the purposes substantially as set forth.

4. In a press for pressing hay or straw for fuel, the supplemental roller H, provided with the hooked arms $g$ and $g'$, in combination with the roller C, as and for the purposes substantially as set forth.

5. In a press for pressing hay or straw for fuel, the yielding planks or spring-boards B, in combination with the roller C, provided with the slot C', and the yielding follower E, and the hooked arms $g$ and $g'$, as and for the purposes substantially as set forth.

6. In a press for pressing hay or straw for fuel, the roller C, provided with the crank F', the spring F, and the mortise C', in combination with the supplemental roller H, provided with the hooked arms $g$ and $g'$, and the yielding pressure-boards B, as and for the purposes substantially as set forth.

In testimony whereof we affix our signatures in presence of two witnesses.

AUGUST BUCHHOLZ.
ALMON W. EDDY.

Witnesses:
   D. B. SCOFIELD,
   P. N. PETERSON.